Patented Dec. 11, 1951

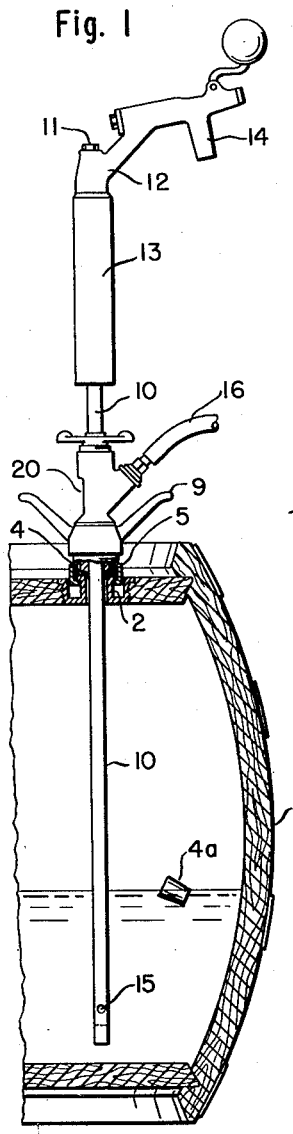
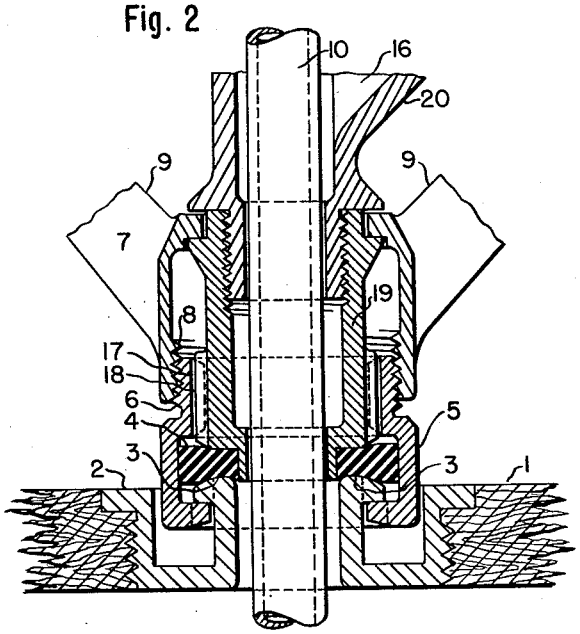
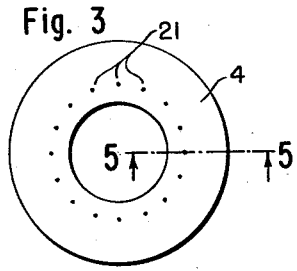
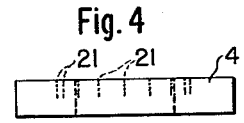
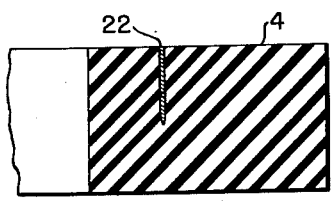

2,578,339

UNITED STATES PATENT OFFICE 2,578,339

SEALING GASKET

Alexander F. Cuthbert, Lynn, Mass.

Application March 11, 1949, Serial No. 80,879

1 Claim. (Cl. 288—33)

The present invention relates to improvements in sealing gasket, and more particularly to washer gaskets for sealing beer barrels.

In the trade of vending beer from beer barrels it is well known that the sealing washers have a relatively short life, due to wear caused by the frequent turning of the beer-tap in the bush located in the beer barrel, and to the contact of the beer with the washer due to leakage. Some users are careless about renewing worn washers, and as a consequence of this negligence considerable loss of beer results, as well as incurring the unsanitary conditions due to such leakage.

The object of my invention is to provide an improved sealing washer which will be effective to increase the life of the washer, thus saving large sums of money to the distributors, viz. the brewers who supply these washers to the trade.

Another object of my invention is to provide a washer which will be resistant to deterioration due to contact with the gas or liquid escaping from the barrel.

Still another object of my invention is to provide a washer which will present a surface having a minimum of frictional resistance to the turning of the tap-head in the barrel bush, this frictional turning involving wear of the washer.

A further object of my invention is to provide a lubricant for the washers which will not contaminate the beer.

These, and other objects of my invention will appear and be better understood by referring more specifically to the accompanying drawing in which Figure 1 is a partial elevation of a beer barrel and tap-head embodying the use of the improved sealing means of my invention; Fig. 2 is an enlarged sectional elevation of a portion of the beer-tap; Fig. 3 is a bottom plan view of my improved washer; Fig. 4 is a side elevation thereof, showing the paraffin extensions in dotted lines, and Fig. 5 is an enlarged sectional view of the washer taken on line 5—5 of Fig. 3.

Referring more specifically to the drawing, I, Fig. 1, represents a wooden beer barrel, and 2, the bush in the head of the barrel, the said bush having a seat 3 against which seat is sealed my improved washer 4. The washer 4 is encased in a clamping collar 5, the latter having a screw-threaded exterior portion 6. A cork 4a normally closes the opening in the washer 4. A clamping head 7 is also provided, having an interior complementary screw-threaded part 8, which fits into the screw-thread 6 of the clamping collar 5. The clamping head 7 also has a wing-nut 9 for tightening the clamping collar 5 against the bush 2 in the beer barrel. A rod 10, having a plug-head 11 in its top end, extends through a faucet head 12 and a sleeve 13. A faucet 14 is provided for drawing the beer. The rod 10 is hollowed and provided with a number of small holes 15 (preferably three) therein. The bottom of the rod 14 is solid. An air inlet 16 in the tap-head admits air under pressure to the barrel. In clamp 5 is a keyway 17 into which fits a spline 18 carried by the interior body 19 of the tap-head 20. This spline 18 locks the tap-head and clamping collar together so that they will not turn independently of each other.

The washer 4 of my invention is made of a polymerized chloroprene, known in the trade as neoprene. While neoprene is not a rubber, it can easily be converted into a tough, elastic body, fully equal to rubber, and resistant to abrasion. In many ways it is far superior to rubber. I have discovered that by treating this material in a paraffin dip, gaskets or washers made of this paraffinned polymerized chloroprene, when subjected to frictional contact, have a much longer life than ordinary rubber washers, even if the latter are also paraffin dipped, and they have a longer life than polymerized chloroprene not so dipped or treated. A modest estimate is that the gaskets or washers of my invention have a length of life many times that of the conventional rubber gaskets or washers now used in the trade. This invention, therefore, results in substantial savings to the brewers who supply the washers to their customers, and the aggregate savings per year is a large financial amount.

In preparing the washers according to the method of my invention, a number of small holes 21 (Fig. 3) are drilled through the outer surface of the washer 4. These holes extend, preferably, for a depth one-half way through the body of the washer. I now apply a film of lubricating oil to the surface of the polymerized chloroprene washer, and permit it to penetrate into the holes. For application to beer barrels, I prefer to use a pure vegetable oil, such as hydrogenated cottonseed oil, which will not contaminate the beer. This results in a lubricated surface to more easily receive the paraffin coating on the surface of the washer and in the holes. I now dip the washer in paraffin, which penetrates into the lubricated holes. The holes 21 (Fig. 3) provide reservoirs of oil lubricant. If a portion of the surface of the washer should become chipped or injured the lubricant oozing from the holes under pressure, seals the injured surface. Another advantage of the lubricated and paraffinned seal is that it moulds itself more perfectly to the part or parts in which it is mounted, and thus provides a most effective seal. Another advantage of this more perfect sealing is that it economizes in the use of air under pressure to fill the barrels. For example, I have found that where, previously, with the present gaskets used in the trade the air tank under a pressure of sixty pounds was emptied in order to fill a given number of beer barrels, with my new gasket washer, and starting with the same pressure, the pressure in the air tank was lowered only two pounds in filling the same number of barrels.

In operation, when it is desired to draw beer from the barrel 1, the tap-head and clamping collar are engaged with the bush 2, as illustrated, the washer 4 being in place in the clamping collar. The tap-head is now turned to seat the washer against seat 3. Rod 10 is inserted through faucet head 12 and sleeve 13 and plug-head 11 is hit hard enough to push cork 4a out of bush 2 into the barrel, as shown in Fig. 1. Air under pressure is now admitted to the barrel by means of air inlet 16. This causes the beer in the barrel to enter the holes 15 in rod 10 and the faucet 14 may now be opened and beer drawn up through hollow rod 10 to the faucet.

What I claim as new and desire to secure by Letters Patent of the United States is:

A sealing gasket made of polymerized chloroprene, the said gasket comprised of a main body having a series of holes extending from the outer sealing surface into the main body of the gasket, a lubricating film of hydrogenated cottonseed oil covering the surface of the gasket and the walls of the holes, and a layer of paraffin superposed on the lubricating film on the gasket surface and the wall surfaces of the holes therein.

ALEXANDER F. CUTHBERT.

REFERENCES CITED

The following references are of record in the file of this patent:

UNITED STATES PATENTS

| Number | Name | Date |
| --- | --- | --- |
| 334,579 | Garlock | Jan. 19, 1886 |
| 542,063 | Mohn | July 2, 1895 |
| 655,380 | Stroh | Aug. 17, 1900 |
| 1,714,033 | Loudenbeck | May 21, 1929 |
| 1,747,917 | Wallace et al. | Feb. 18, 1930 |
| 1,899,821 | Parker | Feb. 28, 1933 |
| 2,145,702 | Wilcox | Jan. 31, 1939 |
| 2,155,457 | West | Apr. 25, 1939 |
| 2,380,762 | Jackson | July 31, 1945 |